May 28, 1929.  L. L. DOLLINGER  1,714,854
AIR FILTER
Filed March 21, 1927  2 Sheets-Sheet 2
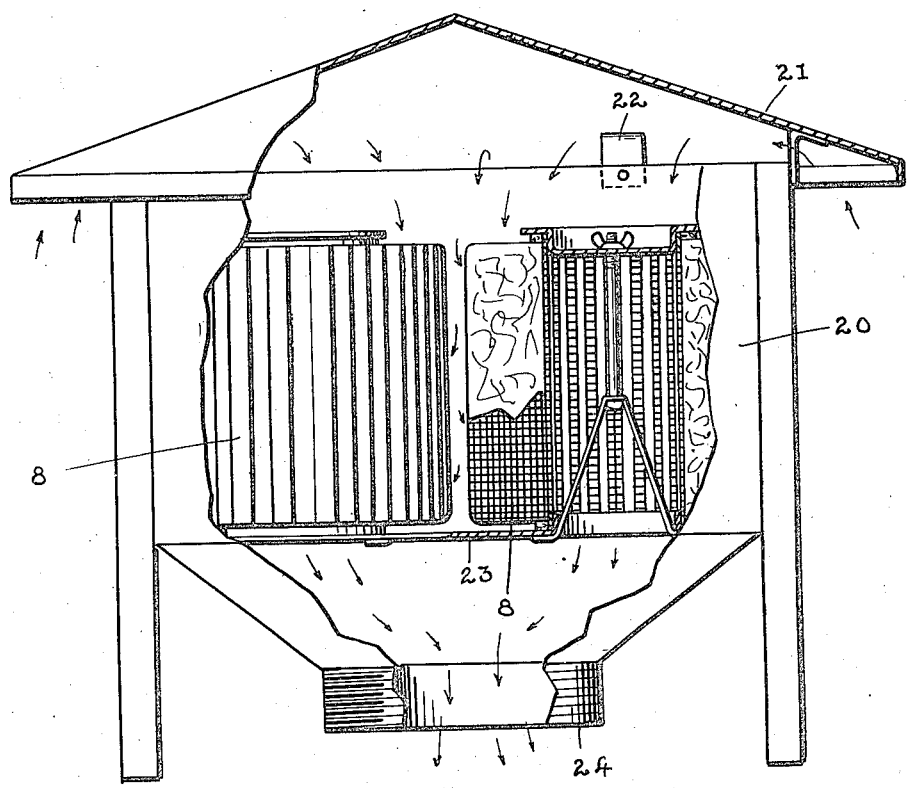
Inventor
Lewis L. Dollinger
By Frank Keiper
Attorney Patented May 28, 1929.

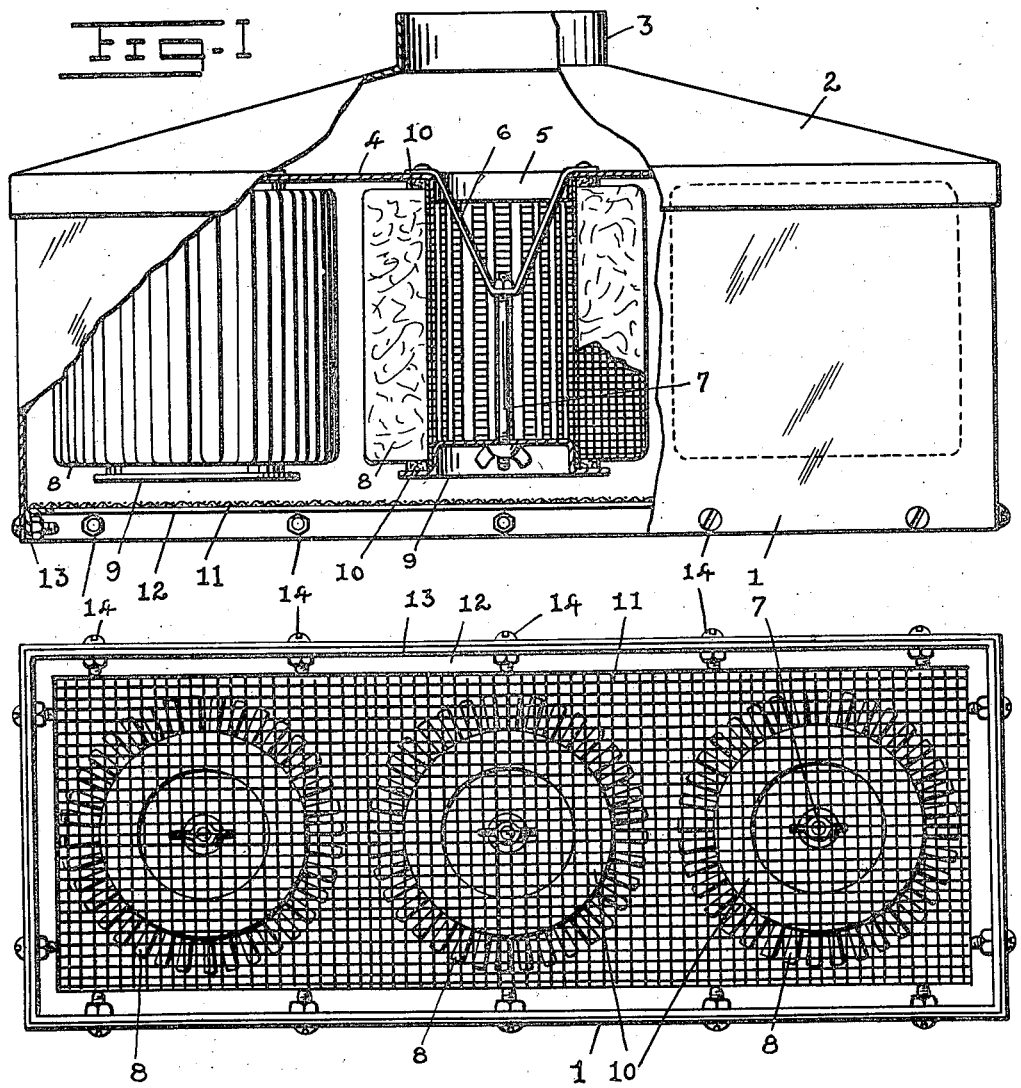

1,714,854

UNITED STATES PATENT OFFICE.

LEWIS L. DOLLINGER, OF ROCHESTER, NEW YORK.

AIR FILTER.

Application filed March 21, 1927. Serial No. 177,018.

The object of this invention is to provide a suitable housing for one or more filtering units and the manner and means with which such filtering units are mounted within the housing.

This and other objects of this invention will be fully illustrated in the drawing, described in the specification and pointed out in the claim at the end thereof.

In the accompanying drawing:

Figure 1 is a side elevation of the housing with a portion of it partly broken away to show the filtering units located within it and the manner in which they are mounted therein.

Figure 2 is a bottom plan view of the complete filter.

Figure 3 is a side elevation of a modified form of the filter with the housing a part of the filtering units partly broken away to illustrate the construction of the housing and the manner in which the filtering units are supported therein.

In the figures of the drawing like reference numerals indicate like parts.

The type of air filter forming the subject matter of this invention is intended to be used where a large volume of air is to be filtered. Large internal combustion engine units, large air compressor units and many other machine units in which the use of clean air is not only desirable but actually a necessity are provided with such air filters and while I have shown such a filter equipped with three filtering units it is understood that a filter with but one filtering unit or any number of them may be built in accordance with this invention.

As illustrated in the figures the filter comprises a rectangular housing 1 having its bottom left open and its top closed with the cover 2. The cover slants upwardly from the sides and ends to the opening or outlet located in the center thereof. The outlet is surrounded by a short sleeve 3 to which a suitable conductor pipe or tubing may be attached.

Within the housing 1 and at the top thereof but below the cover 2 is located the supporting plate 4 from which the filtering units are suspended. For this purpose the supporting plate is provided with a series of holes, one for each of the filtering units. In each of these holes is provided a short sleeve 5. Fastened to the supporting plate 4 are the angular brackets 6, 6 each of which is adapted to support one of the filtering units. These brackets project thru the sleeves 5 and have a hole in the apex thereof into which the end of a clamping bolt 7 can engage to fasten a filtering unit in line with each of the sleeves 5 and below the supporting plate 4.

The filtering units 8, 8 are the same as the filtering units described in my prior Patent No. 1,580,291 and consist of a series of radial pockets grouped around a hollow center and bent up from a wire screen. The sides and ends of the radial pockets are covered with a felt layer which serves as the filtering material thru which the air is drawn. Each of these filtering units is fastened in place by means of one of the clamping bolts 7 and a cover plate 9. The cover plate has a cylindrical dome struck up in the center. A circular flange surrounds the dome and a hole is provided in the center of the dome thru which the end of the bolt 7 can pass. The cylindrical dome is nested into the open bottom of the hollow center of the filtering unit while the cylindrical flange forms the support on which the filtering unit rests. A felt washer 10 is placed above the flange of the cover and another around the short sleeve 5 so that when the upper end of the hollow center of the filtering unit telescopes over the sleeve 5 and the cover is drawn up by the bolt 7 the filtering unit is firmly clamped in place between the under side of the supporting plate and the cover 9 with the felt washers forming a dust proof joint at either end of the unit. All of the filtering units are thus suspended below the supporting plate 4.

The bottom of the housing 1 of the filter is closed with a protective screen 11. This screen is fastened to the horizontal flange 12 of the angle iron 13 which forms a suitable supporting frame therefor. The frame made up of the angle iron is nested into the bottom of the housing 1 and is suitably fastened in place therein by means of the bolts 14, 14. Air can therefore freely enter the bottom of the housing 1 and be drawn thru the filtering units into the upper chamber in the filter and out thru the outlet 3 in the middle thereof. As above described the filter built up in this manner may contain one or any number of filtering units by simply changing the size of the housing 1 and the parts associated therewith. In this way the filter can be adapted for use in small as well as large installations in contradistinction to the filter illustrated in the patent above referred to in which the filtering unit as well as its housing must be changed for different capacities of the filter.

In the modification of the filter illustrated in Figure 3, the housing 20 is provided with a roof cover 21 that is larger than the top of the housing and overhangs the top of the housing being suitably supported thereon by the brackets 22, 22. This provides the intake for the air at the top of the housing. The filtering units instead of being suspended from the underside of a supporting plate are therefore mounted on top of the supporting plate 23 that is located near the bottom of the housing 20. The air is thus drawn into the top of the housing below the cover thereof and passes thru the filtering units and their supporting plate to the bottom of the housing in which the outlet 24 is provided.

I claim:

In an air filter, the combination of a housing having an open bottom and an outlet in the top thereof, a supporting plate within said housing having a hole therein, a V shaped bracket supported on said supporting plate and projecting thru the hole thereof, a filtering unit having both of its ends open, one end of said filtering unit being placed in line with the hole in said supporting plate, a cover plate for the other open end of said filtering unit and a clamping bolt projecting thru said cover and engaging said V shaped bracket to clamp said filtering unit in place below said supporting plate and in line with the hole provided therein.

In testimony whereof I affix my signature.

LEWIS L. DOLLINGER.